M. P. NEWCOMB.
JOURNAL BOX.
APPLICATION FILED APR. 17, 1909.
1,015,335.
Patented Jan. 23, 1912.
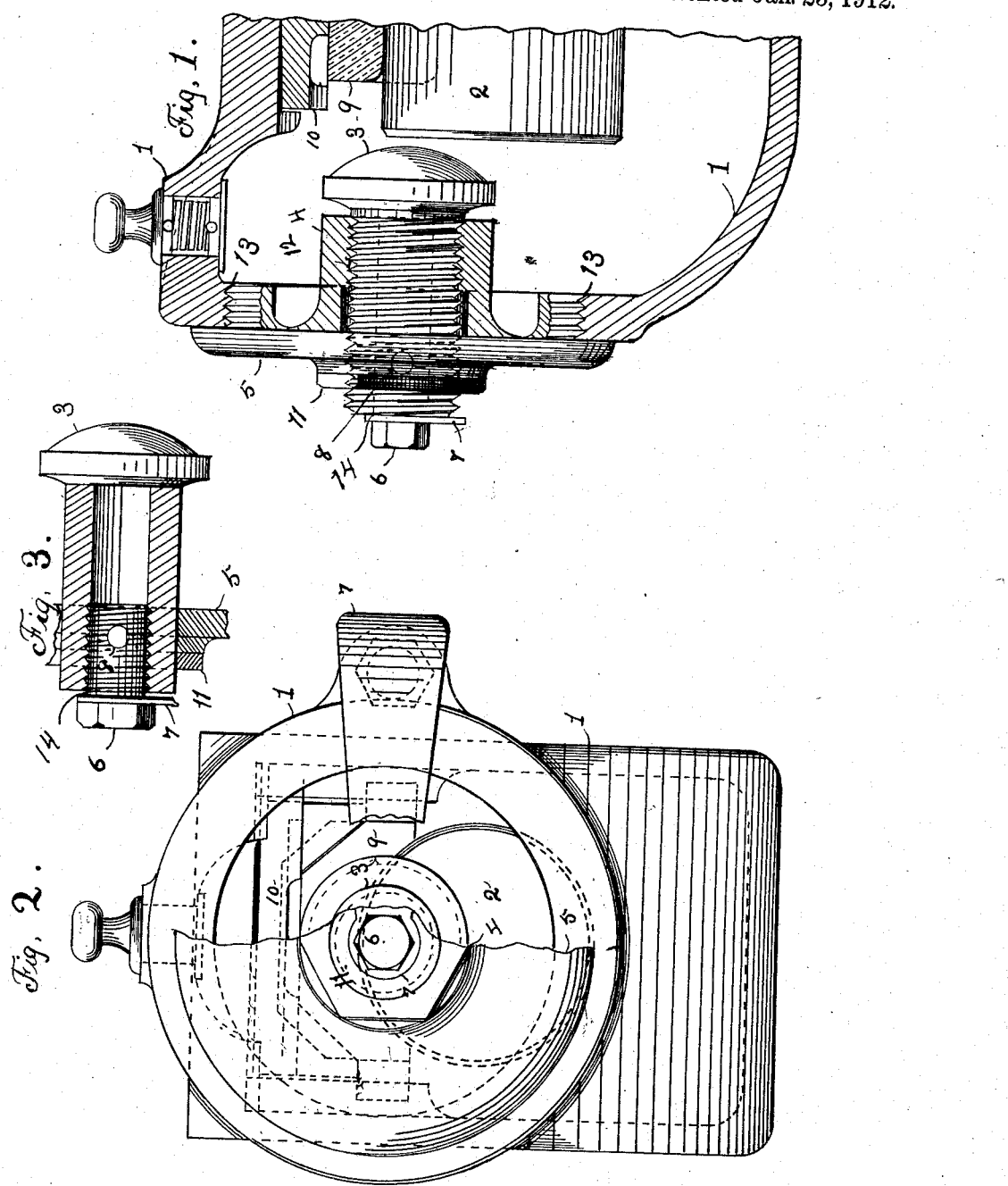
WITNESSES:
INVENTOR
Michael P. Newcomb.
BY
O'Meara & Brock
ATTORNEY

UNITED STATES PATENT OFFICE.

MICHAEL P. NEWCOMB, OF SANDPOINT, IDAHO, ASSIGNOR TO THE LOCOMOTIVE EQUIPMENT COMPANY, OF DETROIT, MICHIGAN, A CORPORATION OF MICHIGAN.

JOURNAL-BOX.

1,015,335.  Specification of Letters Patent.  Patented Jan. 23, 1912.

Application filed April 17, 1909. Serial No. 490,614.

*To all whom it may concern:*

Be it known that I, MICHAEL P. NEWCOMB, a citizen of the United States, residing at Sandpoint, in the county of Kootenai and State of Idaho, have invented a new and useful Improvement in Journal-Boxes, of which the following is a specification.

This invention relates to certain new and useful improvements in my patent for journal boxes, No. 847,992, granted March 19, 1907, the object being to provide means for adjusting the abutting head for preventing end thrust of the journal.

Another object of my invention is to provide a cover for the internally threaded sleeve in which is mounted a shank of an abutting head, said shank being internally threaded in which is secured an adjusting bolt whereby the abutting head can be easily and quickly adjusted by turning the same.

A further object of my invention is to provide a locking nut in connection with the shank of the abutting head whereby the same can be securely locked in its adjusted position whereby all danger of the same turning is prevented.

A still further object of my invention is to provide a cover which is so constructed that the abutting head can be readily removed therefrom, the shank of the abutting head extending clear through the same and against the outer end of which is adapted to bear a flat spring for exerting pressure against the same so as to prevent the cover from turning.

With these objects in view, my invention consists in the novel features of construction, hereinafter fully described, pointed out in the claims and shown in the accompanying drawings, in which:

Figure 1 is a longitudinal sectional view of my improved journal box partly broken away. Fig. 2 is a front view of the same the spring and cover being partly broken away. Fig. 3 is a detail sectional view of the abutting head and shank showing the adjusting bolt in position.

In carrying out my improved invention, I employ a casing 1 in which is mounted a journal 2 having a brass bearing 9 which is locked in position by a steel wedge 10 all of which is of the ordinary construction of journal box now in use, and shown in my drawings to fully illustrate my invention. The casing 1 is provided with a threaded opening 13 in its end in which is mounted a threaded cap 5 which is provided with an inwardly projecting sleeve portion 4 internally threaded as shown at 12 in which is mounted the threaded shank of my improved abutting head 3, said shank extending out through a boss formed on the cover in alinement with the sleeve and on which is mounted a lock nut 11 for securing the abutting head in its adjusted position, as will be hereinafter fully described. The shank of the abutting head 3 is internally threaded as shown at 14 in which is mounted a threaded bolt 6 which is locked therein by a transverse pin 8 whereby the abutting head can be moved in the sleeve by turning the bolt 6 so as to adjust its position with respect to the journal 2 whereby the end thrust of the same can be limited. A flat spring 7 has one end secured to the casing, and its opposite end portion is provided with a suitable opening through which the outer end portion of the bolt 6 passes, said spring being clamped upon the bolt between the head of the bolt and the outer projecting end of the shank of the head 3. As the said head and the cap 5, are united together, the result of this construction is to lock both the abutting head and the cover against any relative movement with respect to each other or to the casing 1. It will be seen that by this construction to adjust the abutting head it is only necessary to loosen the lock nut 11 and by turning the bolt 6 the abutting head can be moved with respect to the journal. In my former patent above referred to, it was necessary to remove the cap in order to adjust the abutting head, and it will be readily seen that by the construction set forth, the abutting head can be readily adjusted from the outside which saves a great deal of trouble and time.

From the foregoing description, it will be seen that I have provided a journal box with an abutting head which is so mounted within the cover of the box that it can be easily and quickly adjusted with respect to the journal of the box so that the end thrust of the journal will be limited and at the same time all danger of the box becoming injured by the same is prevented.

Having thus fully described my invention, what I claim as new and desire to secure by Letters Patent, is:

1. The combination with a journal box having a threaded opening, of a cap mounted in said opening provided with an inwardly projecting sleeve having an internally threaded portion, a threaded shank provided with an abutting head mounted within said sleeve portion and extending out through said cap, said shank being provided with an internally threaded portion, and a bolt adapted to thread in said threaded portion of the shank.

2. The combination with a journal box, of a cap for closing the opening of the box provided with a sleeve having an internally threaded portion, a hollow shank provided with an abutting head, said shank being internally and externally threaded and mounted within the sleeve, a bolt arranged in the outer end of said shank a pin securing said bolt in position, and a locking nut mounted on the shank adapted to engage the cover for holding said abutting head in its adjusted position.

3. A journal box having a threaded opening at one end, a flange cap threaded into said opening, said cap having a central inwardly projecting, internally threaded sleeve portion, a rounded abutting head having a tubular internally and externally threaded shank mounted in said sleeve portion, and extending out through a boss formed on the cap, a threaded bolt mounted in said shank, a pin extending transversely through said shank, and bolt, a spring carried by the box having a bowed end portion, provided with an aperture adapted to receive said bolt, and a lock nut mounted on said bolt.

MICHAEL P. NEWCOMB.

Witnesses:
BRAYTON S. BENNETT,
J. T. McDUFFIE.

Copies of this patent may be obtained for five cents each, by addressing the "Commissioner of Patents, Washington, D. C."